United States Patent
Zhang et al.

(10) Patent No.: US 11,064,481 B2
(45) Date of Patent: Jul. 13, 2021

(54) METHOD AND DEVICE IN UE AND BASE STATION FOR WIRELESS COMMUNICATION

(71) Applicants: Xiaobo Zhang, Shanghai (CN); Lin Yang, Shanghai (CN)

(72) Inventors: Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 106 days.

(21) Appl. No.: 16/673,990

(22) Filed: Nov. 5, 2019

(65) Prior Publication Data

US 2020/0145975 A1    May 7, 2020

(30) Foreign Application Priority Data

Nov. 5, 2018  (CN) .......................... 201811306089.9

(51) Int. Cl.
*H04W 72/04*  (2009.01)
(52) U.S. Cl.
CPC ..... *H04W 72/044* (2013.01); *H04W 72/0406* (2013.01)

(58) Field of Classification Search
CPC ........... H04W 72/0406; H04W 72/044; H04W 74/0808–0816; H04W 4/40; H04W 4/46
See application file for complete search history.

(56) References Cited

U.S. PATENT DOCUMENTS

| | | | |
|---|---|---|---|
| 2015/0271861 A1* | 9/2015 | Li | H04W 76/14 455/426.1 |
| 2017/0188391 A1* | 6/2017 | Rajagopal | H04W 74/0816 |
| 2018/0234889 A1* | 8/2018 | Baghel | H04W 24/08 |
| 2019/0306835 A1* | 10/2019 | Hoang | H04W 72/082 |
| 2020/0029318 A1* | 1/2020 | Guo | H04L 1/1822 |

\* cited by examiner

*Primary Examiner* — Maharishi V Khirodhar
*Assistant Examiner* — Kenneth P Hunt

(57) ABSTRACT

The disclosure provides a method and a device in a User Equipment (UE) and a base station for wireless communication. In one embodiment, a first node performs first monitoring, determines, according to the first monitoring, that a first time-frequency resource pool is not available for a second-type transmission, and transmits first control information, the first control information being used for reserving the first time-frequency resource pool to a first-type transmission; wherein the first monitoring belongs to first-type monitoring; for the first-type transmission and the second-type transmission, second-type monitoring is only used for determining whether the first-type transmission can be performed; and the first-type monitoring is long-term while the second-type monitoring is short-term. The disclosure increases opportunities of transmission, thus improves efficiency of transmission and utilization of spectrum.

20 Claims, 13 Drawing Sheets

METHOD AND DEVICE IN UE AND BASE STATION FOR WIRELESS COMMUNICATION

CROSS-REFERENCE TO RELATED APPLICATION

This application claims the priority benefit of Chinese Patent Application Serial Number 201811306089.9, filed on Nov. 5, 2018, the full disclosure of which is incorporated herein by reference.

BACKGROUND

Technical Field

The disclosure relates to transmission methods and devices in wireless communication systems, and in particular to a method and a device supporting channel monitoring.

Related Art

In 3rd Generation Partner Project (3GPP) Long Term Evolution (LTE) systems, Vehicle to Vehicle (V2V) communication is standardized. In LTE V2V, channel sensing is used for judging whether one Physical Sidelink Control Channel (PSCCH) can be used for V2V transmission.

In 3GPP New Radio (NR) systems, discussions about V2V are ongoing.

SUMMARY

The inventor finds through researches that the channel sensing in LTE V2V is based on long-term measurement and is not beneficial for burst data services. Therefore, how to meet the requirements of burst data services is a problem to be solved.

In view of the above problems, the disclosure provides a solution. It should be noted that the embodiments of the disclosure and the characteristics in the embodiments may be mutually combined arbitrarily if no conflict is incurred. Further, although the disclosure is initially designed for V2V communications, the method and device in the disclosure are also applicable to other types of communications, for example, downlink transmission, uplink transmission, or communications between base stations.

The disclosure provides a method in a first node for wireless communication, wherein the method includes:

performing first monitoring, and determining, according to the first monitoring, that a first time-frequency resource pool is not available for a second-type transmission; and transmitting first control information, the first control information being used for reserving the first time-frequency resource pool to a first-type transmission.

Herein, the first monitoring belongs to first-type monitoring; for the first-type transmission and the second-type transmission, second-type monitoring is only used for determining whether the first-type transmission can be performed; and the first-type monitoring is long-term while the second-type monitoring is short-term.

In one embodiment, only the first-type monitoring among the first-type monitoring and the second-type monitoring includes channel decoding.

In one embodiment, in the above method, time-frequency resources not available for the second-type transmission are reserved to the first-type transmission. Compared with conventional LTE V2V, the above method can increase opportunities of transmission.

In one embodiment, the above method reduces latency by using short-term monitoring.

In one embodiment, the above method reduces false alarm probability by using channel decoding.

Specifically, according to one aspect of the disclosure, the first time-frequency resource pool includes multiple first-type time-frequency resource subpools, and any two of the multiple first-type time-frequency resource subpools are not consecutive in time domain.

Specifically, according to one aspect of the disclosure, the method includes:

determining, according to the first monitoring, that a second time-frequency resource pool is available for the second-type transmission; and transmitting second control information, the second control information being used for reserving the second time-frequency resource pool to the second-type transmission.

Specifically, according to one aspect of the disclosure, the method includes:

selecting a second time-frequency resource subpool from the second time-frequency resource pool.

Herein, the first control information is transmitted in the second time-frequency resource subpool.

Specifically, according to one aspect of the disclosure, the method includes:

transmitting a first radio signal.

Herein, the first radio signal is transmitted in the second time-frequency resource pool, and the first radio signal is directly transmitted; or, the first radio signal is transmitted in the first time-frequency resource pool, and the method further includes:

performing second-monitoring to judge that time-frequency resources occupied by the first radio signal are available for wireless transmission.

Herein, the second monitoring belongs to the second-type monitoring.

Specifically, according to one aspect of the disclosure, the method includes:

transmitting third control information in the second time-frequency resource pool.

Herein, the third control information is used for the first time-frequency resource pool.

Specifically, according to one aspect of the disclosure, the second time-frequency resource pool includes multiple second-type time-frequency resource subpools, and any two of the multiple second-type time-frequency resource subpools are not consecutive in time domain.

Specifically, according to one aspect of the disclosure, the method includes:

receiving first feedback information.

Herein, the first feedback information is used for indicating whether the first radio signal is correctly decoded, the first radio signal is transmitted in the first time-frequency resource pool, and the first feedback information is transmitted in the second time-frequency resource pool.

The disclosure provides a method in a second node for wireless communication, wherein the method includes:

receiving first control information, the first control information being used for reserving a first time-frequency resource pool to a first-type transmission.

Herein, first monitoring is used for determining that the first time-frequency resource pool is not available for a second-type transmission; the first monitoring belongs to first-type monitoring; for the first-type transmission and the second-type transmission, second-type monitoring is only used for determining whether the first-type transmission can be performed; and the first-type monitoring is long-term while the second-type monitoring is short-term.

Specifically, according to one aspect of the disclosure, the first time-frequency resource pool includes multiple first-type time-frequency resource subpools, and any two of the multiple first-type time-frequency resource subpools are not consecutive in time domain.

Specifically, according to one aspect of the disclosure, the method includes:

receiving second control information, the second control information being used for reserving a second time-frequency resource pool to the second-type transmission.

Herein, the first monitoring is used for determining that the second time-frequency resource pool is available for the second-type transmission.

Specifically, according to one aspect of the disclosure, the method includes:

monitoring the first control information in the second time-frequency resource pool.

Herein, the first control information is received in a second time-frequency resource subpool, and the second time-frequency resource subpool belongs to the second time-frequency resource pool.

Specifically, according to one aspect of the disclosure, the method includes:

receiving a first radio signal.

Herein, the first radio signal is transmitted in the second time-frequency resource pool, and the first radio signal is directly transmitted; or, the first radio signal is transmitted in the first time-frequency resource pool, second monitoring is used for judging that time-frequency resources occupied by the first radio signal are available for wireless transmission, and the second monitoring belongs to the second-type monitoring.

Specifically, according to one aspect of the disclosure, the method includes:

receiving third control information in the second time-frequency resource pool.

Herein, the third control information is used for the first time-frequency resource pool.

Specifically, according to one aspect of the disclosure, the second time-frequency resource pool includes multiple second-type time-frequency resource subpools, and any two of the multiple second-type time-frequency resource subpools are not consecutive in time domain.

Specifically, according to one aspect of the disclosure, the method includes:

transmitting first feedback information.

Herein, the first feedback information is used for indicating whether the first radio signal is correctly decoded, the first radio signal is transmitted in the first time-frequency resource pool, and the first feedback information is transmitted in the second time-frequency resource pool.

The disclosure provides a first node for wireless communication, wherein the first node includes:

a first receiver, to perform first monitoring, and to determine, according to the first monitoring, that a first time-frequency resource pool is not available for a second-type transmission; and a first transmitter, to transmit first control information, the first control information being used for reserving the first time-frequency resource pool to a first-type transmission;

Herein, the first monitoring belongs to first-type monitoring; for the first-type transmission and the second-type transmission, second-type monitoring is only used for determining whether the first-type transmission can be performed; and the first-type monitoring is long-term while the second-type monitoring is short-term.

The disclosure provides a second node for wireless communication, wherein the second node includes:

a second receiver, to receive first control information, the first control information being used for reserving a first time-frequency resource pool to a first-type transmission.

Herein, first monitoring is used for determining that the first time-frequency resource pool is not available for a second-type transmission; the first monitoring belongs to first-type monitoring; for the first-type transmission and the second-type transmission, second-type monitoring is only used for determining whether the first-type transmission can be performed; and the first-type monitoring is long-term while the second-type monitoring is short-term.

Specifically, according to one aspect of the disclosure, the second node includes:

a second transmitter, to transmit first control information.

Herein, the first feedback information is used for indicating whether the first radio signal is correctly decoded, the first radio signal is transmitted in the first time-frequency resource pool, and the first feedback information is transmitted in the second time-frequency resource pool.

In one embodiment, compared with conventional schemes, the disclosure has the following advantages.

Opportunities of transmission are increased.

In one embodiment, the above method reduces latency by using short-term monitoring.

In one embodiment, the above method reduces false alarm probability by using channel decoding.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
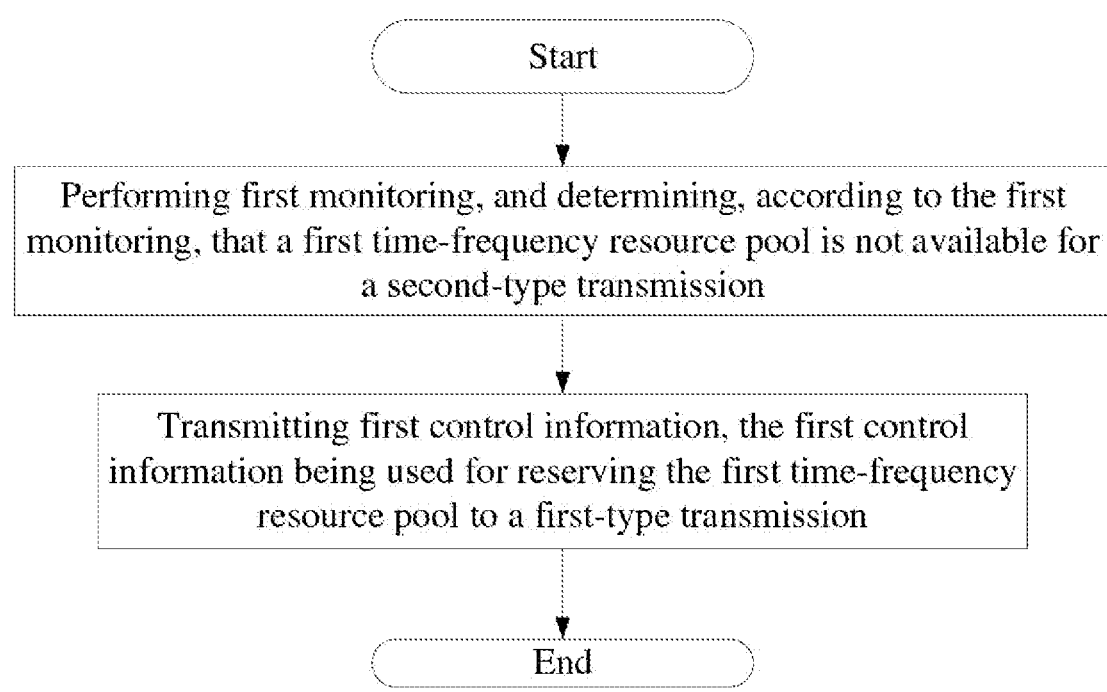
FIG. 1 is a flowchart of processing of a first node according to one embodiment of the disclosure.

Embodiment 1 illustrates an example of a flowchart of processing of a first node, as shown in FIG. 1.

In Embodiment 1, the first node first performs first monitoring, and determines, according to the first monitoring, that a first time-frequency resource pool is not available for a second-type transmission, and then transmits first control information, the first control information being used for reserving the first time-frequency resource pool to a first-type transmission.

In Embodiment 1, the first monitoring belongs to first-type monitoring; for the first-type transmission and the second-type transmission, second-type monitoring is only used for determining whether the first-type transmission can be performed; and the first-type monitoring is long-term while the second-type monitoring is short-term.

In one embodiment, the phrase that the first-type monitoring is long-term while the second-type monitoring is short-term includes: time resources occupied by the first-type monitoring are longer than 10 ms, and time resources occupied by the second-type monitoring are not longer than 1 ms.

In one embodiment, the phrase that the first-type monitoring is long-term while the second-type monitoring is short-term includes: time resources occupied by the first-type monitoring include all available first-type timeslots in a first time window, and the first time window has a duration longer than 100 ms; and time resources occupied by the second-type monitoring are not longer than 1 ms.

In one embodiment, the first time window has a duration of 1000 ms.

In one embodiment, the first-type monitoring includes channel decoding and an energy detection.

In one embodiment, an energy detection performed in the first-type monitoring includes a measurement of Received Signal Strength Indicator (RSSI).

In one embodiment, an energy detection performed in the first-type monitoring includes a measurement of Reference Signal Received Power (RSRP).

In one embodiment, an energy detection performed in the first-type monitoring includes a measurement of Reference Signal Received Quality (RSRQ).

In one embodiment, the channel decoding is based on blind decoding.

In one embodiment, in the channel decoding, the first node judges according to a Cyclic Redundancy Check (CRC) whether control information is correctly received.

In one embodiment, the first control information indicates explicitly that the first time-frequency resource pool is reserved to the first-type transmission.

In one embodiment, frequency-domain resources occupied by the first control information indicate implicitly that the first time-frequency resource pool is reserved to the first-type transmission.

In one embodiment, the first time-frequency resource pool includes multiple Resource Elements (REs).

In one embodiment, the second-type transmission can be directly performed without monitoring.

In one embodiment, the second-type transmission can be directly performed without the second-type monitoring.

In one embodiment, the first control information belongs to one piece of Sidelink Control Information (SCI).

In one embodiment, the first control information is transmitted on a Physical Sidelink Control Channel (PSCCH).

In one embodiment, the first control information is transmitted on a Physical Sidelink Shared Channel (PSSCH).

In one embodiment, the first control information indicates the first time-frequency resource pool.

In one embodiment, the transmission of the first control information belongs to the second-type transmission.

In one embodiment, the second-type monitoring is based on energy detection.

In one embodiment, the channel decoding performed in the first-type monitoring aims at a PSCCH.

In one embodiment, the first node is one UE.

In one embodiment, the first node is one repeater device.

In one embodiment, the first node is one base station.

In one embodiment, the first time-frequency resource pool includes multiple multicarrier symbols in time domain.

In one embodiment, the multicarrier symbol is an Orthogonal Frequency Division Multiplexing (OFDM) symbol.

In one embodiment, the multicarrier symbol is a Single Carrier Frequency Division Multiplexing Access (SC-FDMA) symbol.

In one embodiment, the multicarrier symbol is a Single Carrier Frequency Division Multiplexing Access (SC-FDMA) symbol.

In one embodiment, the multicarrier symbol is a Filter Bank Multi-Carrier (FBMC) symbol. In one embodiment, the first time-frequency subresource and the second time-frequency subresource belong to one same carrier in frequency domain.

In one embodiment, the first time-frequency resource pool includes multiple first-type time-frequency resource subpools, and any two of the multiple first-type time-frequency resource subpools are not consecutive in time domain.

In one embodiment, any one of the multiple first-type time-frequency resource subpools includes multiple REs.

In one embodiment, any two of the multiple first-type time-frequency resource subpools occupy same subcarrier (s) in frequency domain.

In one embodiment, any two of the multiple first-type time-frequency resource subpools occupy a same number of multicarrier symbols in time domain.

Embodiment 2

Figure 2:
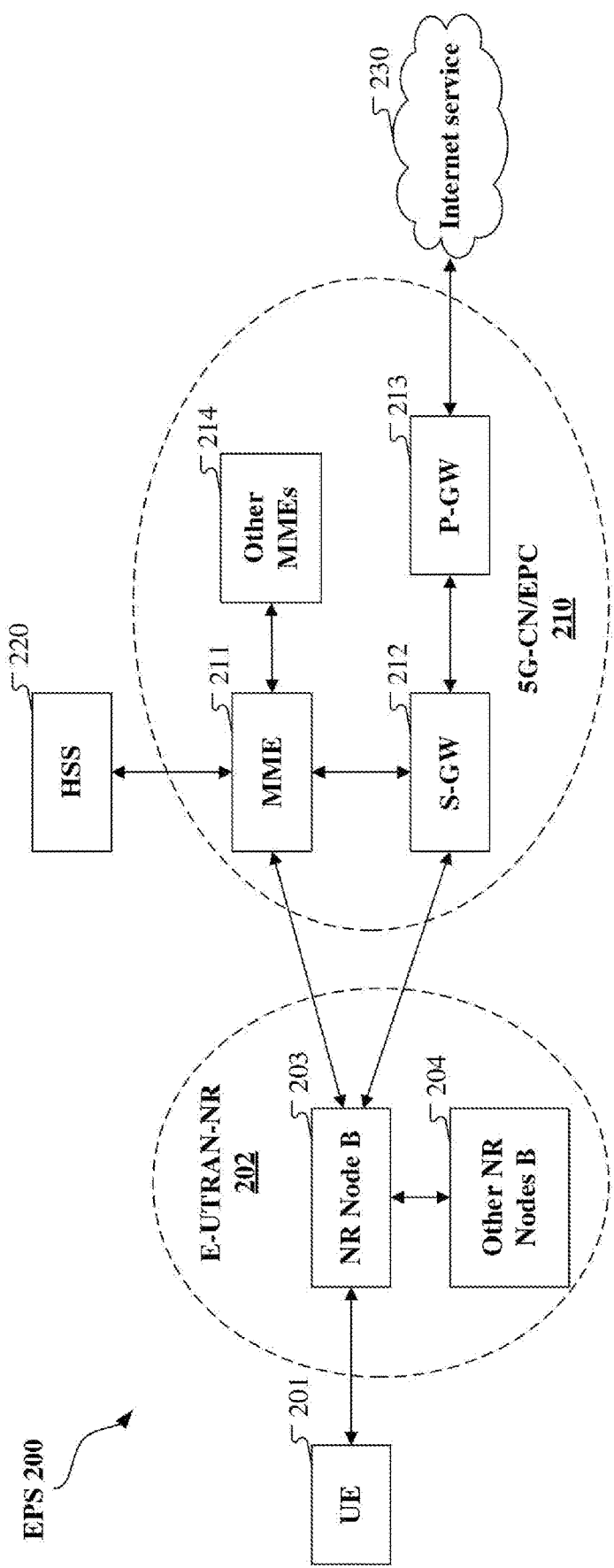
FIG. 2 is a diagram illustrating a network architecture according to one embodiment of the disclosure.

Embodiment 2 illustrates an example of a diagram of a network architecture, as shown in FIG. 2.

FIG. 2 illustrates a network architecture 200 of Long-Term Evolution (LTE), Long-Term Evolution Advanced (LTE-A) and future 5G systems. The LTE network architecture 200 may be called an Evolved Packet System (EPS)

200. The EPS 200 may include one or more UEs 201, an Evolved UMTS Terrestrial Radio Access Network-New Radio (E-UTRAN-NR) 202, a 5G-Core Network/Evolved Packet Core (5G-CN/EPC) 210, a Home Subscriber Server (HSS) 220 and an Internet Service 230. Herein, the UMTS represents Universal Mobile Telecommunication System. The EPS may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services. The E-UTRAN-NR includes an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a mobile client or other appropriate terms. The gNB 203 is connected to the 5G-CN/EPC 210 via an S1 interface. The 5G-CN/EPC 210 includes an MME 211, other MMEs 214, a Service Gateway (S-GW) 212 and a Packet Data Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Streaming Services (PSSs).

In one embodiment, the UE 201 corresponds to the first node in the disclosure.

In one embodiment, the UE 201 corresponds to the second node in the disclosure.

In one embodiment, the first node and the second node in the disclosure correspond to one embodiment of the UE 201 respectively.

In one embodiment, the gNB 203 corresponds to the first node in the disclosure.

In one embodiment, the gNB 203 corresponds to the second node in the disclosure.

In one subembodiment, the UE 201 supports V2V communication.

In one subembodiment, the gNB 203 supports V2V communication.

Embodiment 3

Figure 3:
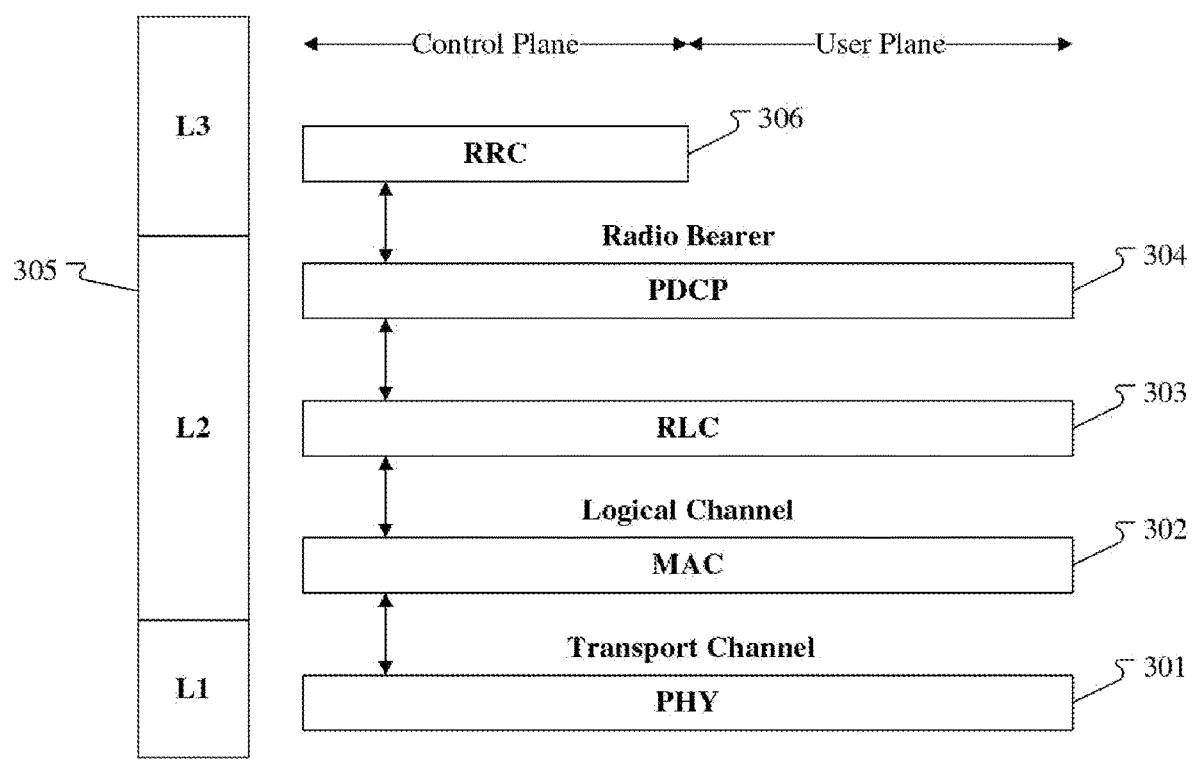
FIG. 3 is a diagram illustrating an embodiment of a radio protocol architecture of a user plane and a control plane according to one embodiment of the disclosure.

FIG. 3 is illustrates an example of a diagram of an embodiment of a radio protocol architecture of a user plane and a control plane, as shown in FIG. 3.

FIG. 3 is a diagram of an embodiment of a radio protocol architecture of a user plane and a control plane. In FIG. 3, the radio protocol architecture of a UE and a gNB is represented by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown, the UE may include several higher layers above the L2 layer 305, including a network layer (i.e. IP layer) terminated at the P-GW 813 on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the radio protocol architecture shown in FIG. 3 is applicable to the first node in the disclosure.

In one embodiment, the radio protocol architecture shown in FIG. 3 is applicable to the second node in the disclosure.

In one embodiment, the first control information in the disclosure is generated on the PHY 301.

In one embodiment, the second control information in the disclosure is generated on the PHY 301.

In one embodiment, the third control information in the disclosure is generated on the PHY 301.

In one embodiment, the first control information in the disclosure is interpreted on the PHY 301.

In one embodiment, the second control information in the disclosure is interpreted on the PHY 301.

In one embodiment, the third control information in the disclosure is interpreted on the PHY 301.

In one embodiment, the first-type monitoring in the disclosure is performed on the PHY 301.

In one embodiment, the second-type monitoring in the disclosure is performed on the PHY 301.

Embodiment 4

Figure 4:
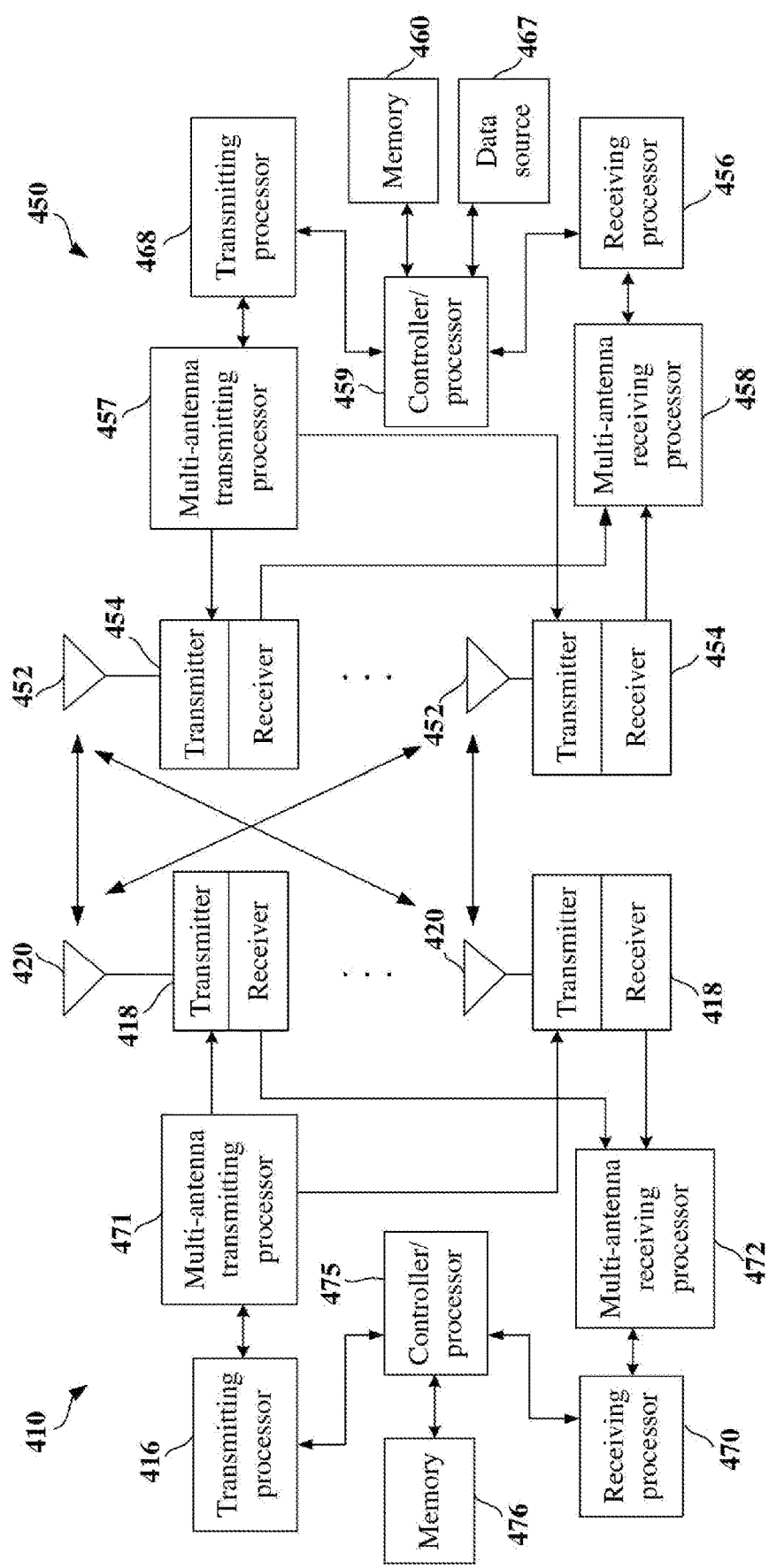
FIG. 4 is a diagram illustrating a first node and a second node according to one embodiment of the disclosure.

Embodiment 4 illustrates an example of a diagram of a first node and a second node, as shown in FIG. 4. FIG. 4 is a block diagram of a node 410 and a node 450 that are in communication with each other in an access network.

The node 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

The node 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a link of transmission from the node 410 to the node 450, at the node 410, a higher-layer packet from a core network is provided to the controller/processor 475. The controller/processor 475 provides functions of Layer 2. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the second node 410 and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding/beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with a transmitting analog precoding/beamforming operation. Each transmitter 418 converts a baseband multicarrier symbol stream provided by the multi-antenna transmitting processor 471 into a radio frequency stream and then provides it to different antennas 420.

In a link of transmission from the node 410 to the node 450, at the node 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with a receiving analog precoding/beamforming operation. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second node 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. The controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In one embodiment, in the link of transmission from the node 410 to the node 450, The controller/processor 475 is also in charge of HARQ operation, retransmission of lost packets, and signalings to the UE 450. The controller/processor 459 also performs error detection using ACK and/or NACK protocols to support the HARQ operation.

In one embodiment, in the link of transmission from the node 410 to the node 450, the controller/processor 475 provides header compression, encryption, packet segmentation and reordering, multiplexing between a logical channel and a transport channel, and a radio resource allocation for the node 450 based on various priority metrics. The controller/processor 459 provides multiplexing between the transport channel and the logical channel, packet reassembling, decryption, header decompression, and control signal processing based on the radio resource allocation of the controller/processor 475 so as to recover the higher-layer packet.

In one embodiment, in the link of transmission from the node 410 to the node 450, the controller/processor 475 provides header compression, encryption, packet segmentation and reordering, and multiplexing between a logical channel and a transport channel based on the radio resource allocation of the controller/processor 459.

In one embodiment, in the link of transmission from the node 410 to the node 450, the controller/processor 475 provides the functions of Layer 2 used for the control plane and user plane.

In one embodiment, in the link of transmission from the node 410 to the node 450, the controller/processor 459 provides the functions of Layer 2 used for the control plane and user plane.

In one embodiment, in the link of transmission from the node 450 to the node 410, transmission steps in the link of transmission from the node 410 to the node 450 are repeated, except that the functions of modules in the node 410 are completed by corresponding modules in the node 450 and that the functions of modules in the node 450 are completed by corresponding modules in the node 410.

In one embodiment, the node 410 is the first node in the disclosure, and the node 450 is the second node in the disclosure.

In one subembodiment, the antenna 452, the receiver 454 and the receiving processor 456 are used for receiving the first control information in the disclosure, and the antenna 420, the transmitter 418 and the transmitting processor 416 are used for transmitting the first control information in the disclosure.

In one subembodiment, the antenna 452, the receiver 454 and the receiving processor 456 are used for receiving the second control information in the disclosure, and the antenna 420, the transmitter 418 and the transmitting processor 416 are used for transmitting the second control information in the disclosure.

In one subembodiment, the antenna 452, the receiver 454 and the receiving processor 456 are used for receiving the third control information in the disclosure, and the antenna 420, the transmitter 418 and the transmitting processor 416 are used for transmitting the third control information in the disclosure.

In one subembodiment, the antenna 452, the receiver 454 and the receiving processor 456 are used for receiving the first radio signal in the disclosure, and the antenna 420, the transmitter 418 and the transmitting processor 416 are used for transmitting the first radio signal in the disclosure.

In one subembodiment, the antenna 420, the receiver 418 and the receiving processor 470 are used for the first monitoring in the disclosure.

In one subembodiment, the antenna 420, the receiver 418 and the receiving processor 470 are used for the second monitoring in the disclosure.

In one subembodiment, the controller/processor 475 is used for the first monitoring in the disclosure.

In one subembodiment, the controller/processor 475 is not used for the second monitoring in the disclosure.

In one subembodiment, the node 410 includes at least one processor and at least one memory. The at least one memory includes computer program codes. The at least one memory and the computer program codes are configured to be used in collaboration with the at least one processor. The node 410 at least performs first monitoring, determines, according to the first monitoring, that a first time-frequency resource pool is not available for a second-type transmission, and transmits first control information, the first control information being used for reserving the first time-frequency resource pool to a first-type transmission; wherein the first monitoring belongs to first-type monitoring; for the first-type transmission and the second-type transmission, second-type monitoring is only used for determining whether the first-type transmission can be performed; and the first-type monitoring is long-term while the second-type monitoring is short-term.

In one subembodiment, the node 450 includes at least one processor and at least one memory. The at least one memory includes computer program codes. The at least one memory and the computer program codes are configured to be used in collaboration with the at least one processor. The node 450 at least receives first control information, the first control information being used for reserving a first time-frequency resource pool to a first-type transmission; wherein first monitoring is used for determining that the first time-frequency resource pool is not available for a second-type transmission; the first monitoring belongs to first-type monitoring; for the first-type transmission and the second-type transmission, second-type monitoring is only used for determining whether the first-type transmission can be performed; and the first-type monitoring is long-term while the second-type monitoring is short-term.

In one embodiment, the node 410 includes a memory that stores a computer readable instruction program. The computer readable instruction program generates an action when executed by at least one processor. The action includes: performing first monitoring, and determining, according to the first monitoring, that a first time-frequency resource pool is not available for a second-type transmission; and transmitting first control information, the first control information being used for reserving the first time-frequency resource pool to a first-type transmission; wherein the first monitoring belongs to first-type monitoring; for the first-type transmission and the second-type transmission, second-type monitoring is only used for determining whether the first-type transmission can be performed; and the first-type monitoring is long-term while the second-type monitoring is short-term.

In one embodiment, the node 450 includes a memory that stores a computer readable instruction program. The computer readable instruction program generates an action when executed by at least one processor. The action includes: receiving first control information, the first control information being used for reserving a first time-frequency resource pool to a first-type transmission; wherein first monitoring is used for determining that the first time-frequency resource pool is not available for a second-type transmission; the first monitoring belongs to first-type monitoring; for the first-type transmission and the second-type transmission, second-type monitoring is only used for determining whether the first-type transmission can be performed; and the first-type monitoring is long-term while the second-type monitoring is short-term.

In one embodiment, the node 410 and the node 450 are UEs respectively.

In one embodiment, the node 410 and the node 450 are base stations respectively.

In one embodiment, the node 410 and the node 450 are a base station and a UE respectively.

Embodiment 5

Figure 5:
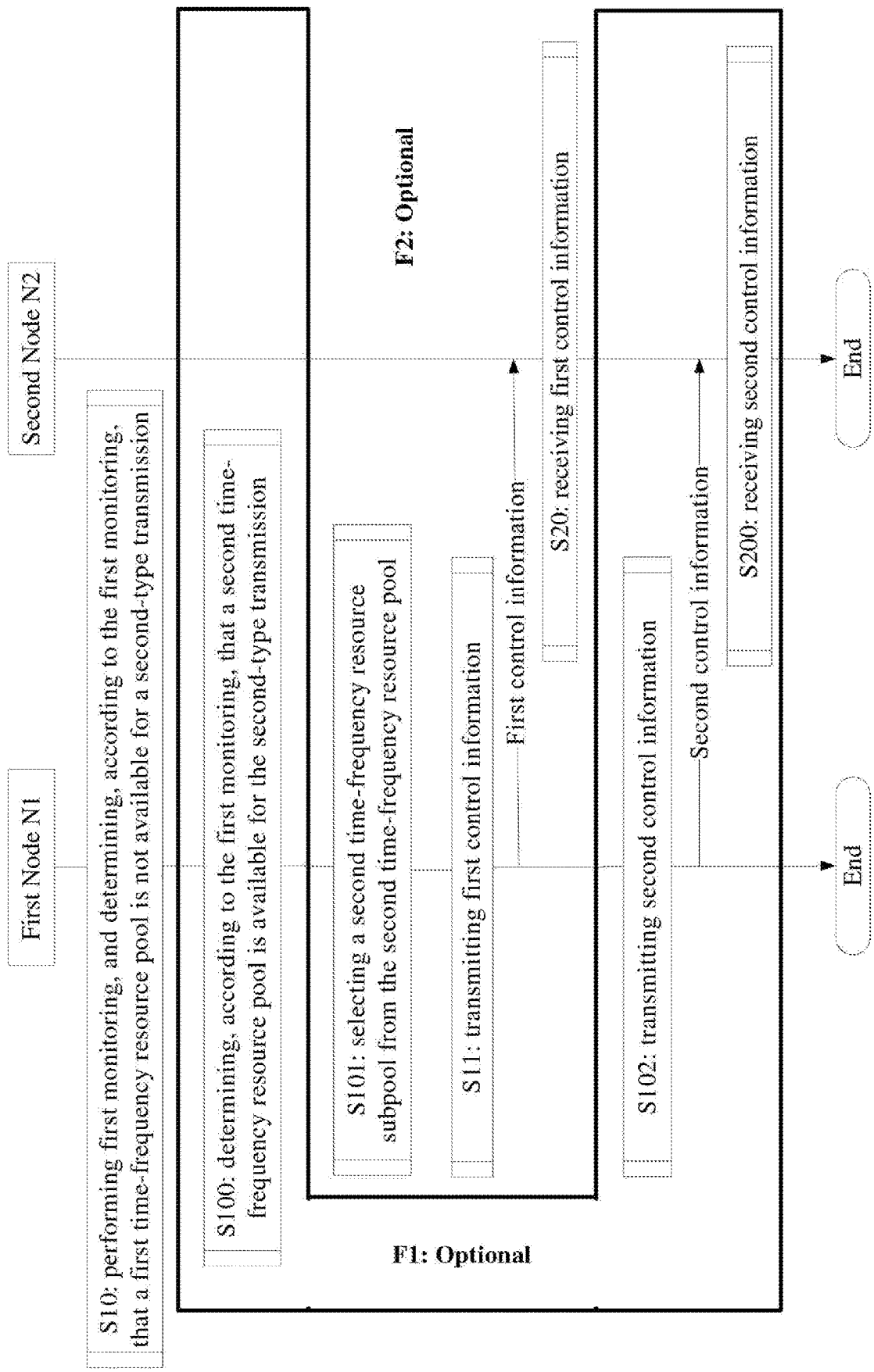
FIG. 5 is a flowchart of transmission of first control information and second control information according to one embodiment of the disclosure.

Embodiment 5 illustrates an example of a flowchart of transmission of first control information and second control information, as shown in FIG. 5. In FIG. 5, steps in boxes F1 and F2 are optional.

The first node N1 performs first monitoring, and determines, according to the first monitoring, that a first time-frequency resource pool is not available for a second-type transmission in S10, determines, according to the first monitoring, that a second time-frequency resource pool is available for the second-type transmission in S100, selects a second time-frequency resource subpool from the second time-frequency resource pool in S101, transmits first control information in S11, the first control information being used for reserving the first time-frequency resource pool to a first-type transmission, and transmits second control information in S102, the second control information being used for reserving the second time-frequency resource pool to the second-type transmission.

The node N2 receives the first control information in S20 and receives the second control information in S200.

In embodiment 5, the first monitoring belongs to first-type monitoring; for the first-type transmission and the second-type transmission, second-type monitoring is only used by the first node N1 to determine whether the first-type transmission can be performed; and the first-type monitoring is long-term while the second-type monitoring is short-term. The first control information is transmitted in the second time-frequency resource subpool.

In one embodiment, first monitoring is used by the first node N1 to determine that a time-frequency resource pool is not available for a second-type transmission.

In one embodiment, the first time-frequency resource set and the second time-frequency resource set are orthogonal.

In one embodiment, no RE belongs to both the first time-frequency resource set and the second time-frequency resource set.

In one embodiment, the first time-frequency resource set and the second time-frequency resource set are orthogonal in frequency domain.

In one embodiment, no subcarrier belongs to both the first time-frequency resource set and the second time-frequency resource set.

In one embodiment, the second control information and the first control information are transmitted on two physical layer channels respectively.

In one embodiment, the second control information and the first control information are transmitted on one same physical layer channel.

In one embodiment, the physical layer channel is a PSCCH.

In one embodiment, the physical layer channel is a PSSCH.

In one embodiment, the second time-frequency resource pool and the first time-frequency resource pool are orthogonal.

In one embodiment, no RE belongs to both the second time-frequency resource pool and the first time-frequency resource pool.

In one embodiment, the first node can transmit a radio signal in the second time-frequency resource pool directly.

In one embodiment, the second control information indicates the second time-frequency resource pool, and the first control information indicates the first time-frequency resource pool.

In one embodiment, the second control information indicates the second time-frequency resource pool, and the first time-frequency resource pool is associated to the second time-frequency resource pool.

In one embodiment, frequency-domain resources occupied by the second control information indicate explicitly that the second time-frequency resource pool is reserved to the second-type transmission.

In one embodiment, frequency-domain resources occupied by the second control information indicate implicitly that the second time-frequency resource pool is reserved to the second-type transmission.

In one embodiment, the second time-frequency resource pool and the first time-frequency resource pool include multiple REs respectively.

In one embodiment, the first-type transmission refers that the transmission can be performed only after the second-type monitoring is passed, and the second-type monitoring refers that the transmission may be directly performed without monitoring.

In one embodiment, the first-type monitoring is as described in 14.1.1.6 in 3GPP TS36.213.

In one embodiment, the second-type monitoring includes Listen Before Talk (LBT).

In one embodiment, the second-type monitoring includes Type 2 LBT.

In one embodiment, the second-type monitoring includes Type 4 LBT.

Embodiment 6

Figure 6:
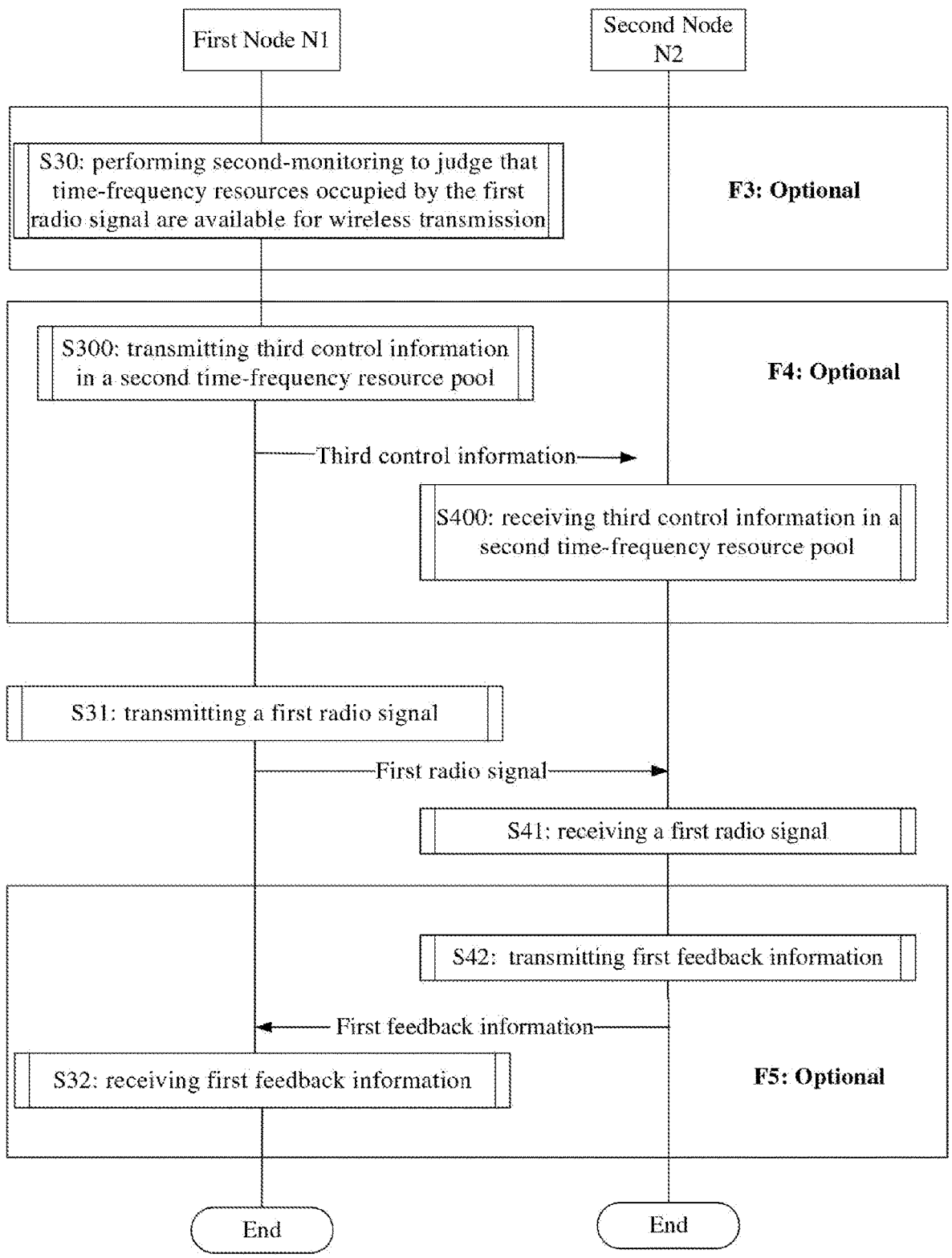
FIG. 6 is a flowchart of transmission of a first radio signal according to one embodiment of the disclosure.

Embodiment 6 illustrates an example of a flowchart of transmission of a first radio signal, as shown in FIG. 6. In FIG. 6, steps in boxes F3, F4 and F5 are optional.

A first node N1 performs second-monitoring to judge that time-frequency resources occupied by the first radio signal are available for wireless transmission in S30, transmits third control information in a second time-frequency resource pool in S300, transmits a first radio signal in S31, and receives first feedback information in S32.

A second node N2 receives the third control information in the second time-frequency resource pool in S400, receives the first radio signal in S41, and transmits the first feedback information in S42.

In Embodiment 6, the third control information is used for the first time-frequency resource pool, and the first feedback information is used for indicating whether the first radio signal is correctly decoded.

In one embodiment, the first radio signal is transmitted in the first time-frequency resource pool, and the first feedback information is transmitted in the second time-frequency resource pool.

The above embodiment can ensure the reliability of transmission of the first feedback information, and can reduce latency. Similarly, if S400 and S300 exist, the above embodiment can ensure the reliability of transmission of the third control information.

In one subembodiment, time-frequency resources occupied by the first feedback information are related to time-frequency resources occupied by the first radio signal.

In one subembodiment, time-frequency resources occupied by the first feedback information are related to the third control information.

In one embodiment, the first radio signal is transmitted in the second time-frequency resource pool, and the first radio signal is directly transmitted.

In one embodiment, if the first radio signal is transmitted in the second time-frequency resource pool, and the first radio signal is directly transmitted.

In one embodiment, the time-frequency resources occupied by the first radio signal include multiple REs.

In one embodiment, the time-frequency resources occupied by the first radio signal include a positive integer number of subcarriers in frequency domain.

In one embodiment, the time-frequency resources occupied by the first radio signal include a positive integer number of multicarrier symbols in time domain.

In one embodiment, the action that the first radio signal is directly transmitted includes: no second-type monitoring is performed before the first radio signal is transmitted.

In one embodiment, the action that the first radio signal is directly transmitted includes: except the first monitoring, the UE does not need to perform monitoring to judge that time-frequency resources occupied by the first radio signal are available for wireless transmission.

In one embodiment, the first radio signal is transmitted on a PSSCH.

In one embodiment, the second time-frequency resource pool includes multiple second-type time-frequency resource subpools, and any two of the multiple second-type time-frequency resource subpools are not consecutive in time domain; the time-frequency resources occupied by the first radio signal belong to one of the multiple second-type time-frequency resource subpools.

In one embodiment, the third control information is used for indicating one first-type time-frequency resource subpool, the one first-type time-frequency resource subpool belongs to the first time-frequency resource pool, and the first time-frequency resource pool includes multiple first-type time-frequency resource subpools.

In one embodiment, the third control information is used for indicating that the one first-type time-frequency resource subpool is occupied by the UE.

In one embodiment, the third control information is used for indicating that the one first-type time-frequency resource subpool is not occupied by the UE.

In one embodiment, the first radio signal is transmitted in the first time-frequency resource pool, the third control information includes configuration information of the first radio signal, and the configuration information includes at least one of occupied time-domain resources, occupied frequency-domain resources, a Modulation and Coding Status (MCS), a Redundancy Version (RV), a Hybrid Auto repeat ReQuest (HARQ) process number and a New Data Indicator (NDI).

In one subembodiment, the third control information includes a first field, the first field includes a positive integer number of information bits, the first field in the third control information indicates the first time-frequency resource pool from Q1 candidate time-frequency resource pools, and the Q1 is a positive integer greater than 1; the first time-frequency resource pool and the second time-frequency resource pool are one candidate time-frequency resource pool among the Q1 candidate time-frequency resource pools respectively.

In one subembodiment, the third control information and the first control information in the disclosure are transmitted on one same physical layer channel.

Embodiment 7

Figure 7:
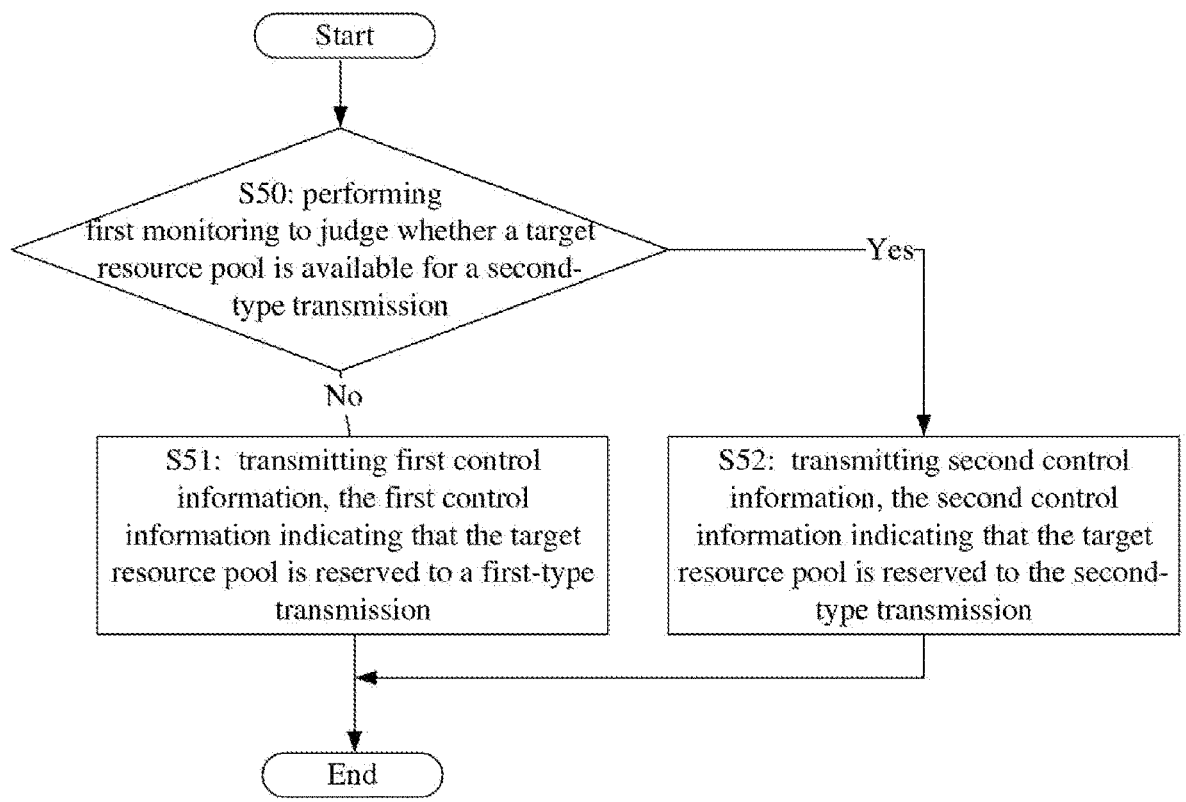
FIG. 7 is a flowchart of configuration of a target resource pool according to one embodiment of the disclosure.

Embodiment 7 illustrates an example of a flowchart of configuration of a target resource pool, as shown in FIG. 7. The steps in FIG. 7 are executed by a first node.

In S50, the first node performs first monitoring to judge whether a target resource pool is available for a second-type transmission; if yes, in S52, the first node transmits second control information, the second control information indicating that the target resource pool is reserved to the second-type transmission; otherwise, in S51, the first node transmits first control information, the first control information indicating that the target resource pool is reserved to the first-type transmission.

In one embodiment, the target resource pool occupies in time domain any one second-type timeslot in a set A illustrated in embodiment 11; only when the target resource pool is available for the second-type transmission, the target resource pool is moved to a set B illustrated in 11 from the set A.

Embodiment 8

Figure 8:
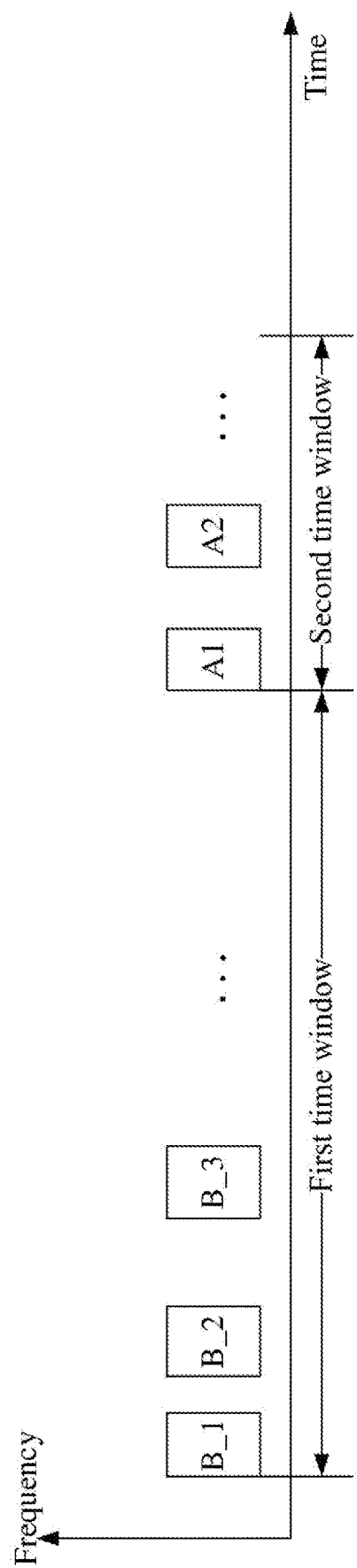
FIG. 8 is a diagram illustrating a first time window and a second time window according to one embodiment of the disclosure.

Embodiment 8 illustrates an example of a diagram of a first time window and a second time window, as shown in FIG. 8.

In Embodiment 8, the first time window includes multiple first-type timeslots, and boxes B_1, B_2, B_3, . . . shown in FIG. 8 represent one first-type timeslot among the multiple first-type timeslots respectively. The first monitoring performed by the first node occupies the first-type timeslots indicated by the boxes B_1, B_2, B-3, . . . in time domain. The second time window includes multiple second-type timeslots, and boxes A1, A2, . . . in FIG. 8 represent one second-type timeslot among the multiple second-type timeslots respectively.

In one embodiment, the multiple first-type timeslots have a same duration.

In one embodiment, the multiple second-type timeslots have a same duration.

In one embodiment, any one of the multiple first-type timeslots includes a positive integer number of multicarrier symbols, and any one of the multiple second-type timeslots includes a positive integer number of multicarrier symbols.

In one embodiment, the first time-frequency resource pool in the disclosure belongs to the second-type timeslots indicated by the boxes A1, A2, . . . in time domain.

In one embodiment, the second time-frequency resource pool in the disclosure belongs to the second-type timeslots indicated by the boxes A1, A2, . . . in time domain.

In one embodiment, the first time-frequency resource pool and the second time-frequency resource pool in the disclosure constitute the second-type timeslots indicated by the boxes A1, A2, . . . in time domain.

In one embodiment, in each of the first-type timeslots indicated by the boxes B_1, B_2, B_3, . . . , the first node performs blind decoding; if an SCI can be correctly decoded, the first node determines time-domain resources reserved by the SCI according to the SCI.

In one embodiment, the boxes B_1, B_2, B_3, . . . indicate all available first-type timeslots in the first time window, and the boxes A1, A2, . . . indicate all available second-type timeslots in the second time window In one subembodiment, if any one first-type timeslot in the first time window is not reserved to a V2V transmission, the any one first-type timeslot in the first time window is considered unavailable.

In one subembodiment, if the first node transmits a radio signal in any one first-type timeslot in the first time window, the any one first-type timeslot in the first time window is considered as unavailable.

In one embodiment, the first time window is of 100 ms, and the second time window is not longer than 100 ms.

In one embodiment, the first time window consists of multiple consecutive first-type timeslots, and the second time window consists of multiple consecutive second-type timeslots.

In one embodiment, the first-type timeslot can be used for transmitting a PSCCH, and the second-type timeslot can be used for transmitting a PSSCH.

Embodiment 9

Figure 9:
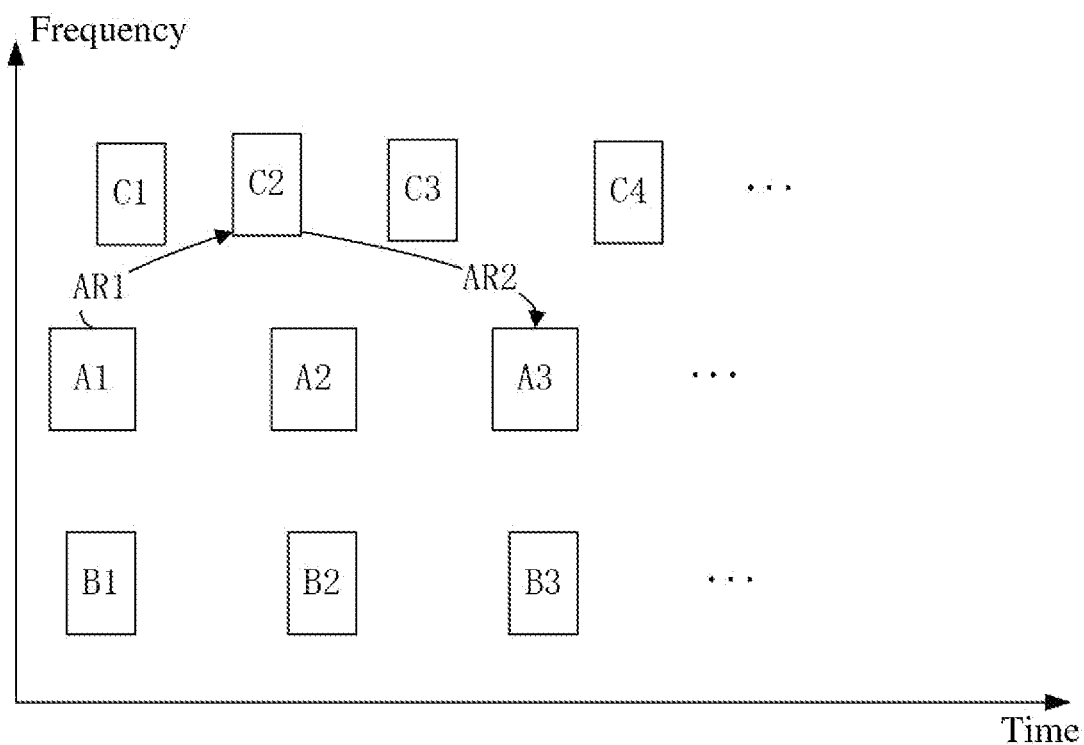
FIG. 9 is a diagram illustrating a time-frequency resource subpool according to one embodiment of the disclosure.

Embodiment 9 illustrates an example of a diagram of a time-frequency resource subpool, as shown in FIG. 9.

In Embodiment 9, a second time-frequency resource pool includes multiple second-type time-frequency resource subpools, as indicated by boxes A1, A2, A3, . . . in FIG. 9. Each second-type time-frequency resource subpool in the second time-frequency resource pool includes multiple REs.

In one embodiment, each second-type time-frequency resource subpool in the second time-frequency resource pool occupies in time domain one second-type timeslot illustrated in Embodiment 8.

In one embodiment, all second-type time-frequency resource subpools in the second time-frequency resource pool occupy same frequency-domain resources.

In one embodiment, each second-type time-frequency resource subpool in the second time-frequency resource pool occupies Q3 Resource Blocks (RBs) in frequency domain, the Q3 being a positive integer.

In one embodiment, the Q3 is 2.

In one embodiment, each second-type time-frequency resource subpool in the second time-frequency resource pool occupies one sub-channel in frequency domain.

In one embodiment, a first time-frequency resource pool and the second time-frequency resource pool occupy same frequency-domain resources.

In one embodiment, a first time-frequency resource pool includes multiple first-type time-frequency resource subpools; and boxes B1, B2, B3, . . . in FIG. 9 indicate one first-type time-frequency resource subpool among the multiple first-type time-frequency resource subpools respectively.

In one embodiment, a first time-frequency resource pool includes multiple first-type time-frequency resource subpools; and boxes B1, B2, B3, . . . , C1, C2, C3, . . . in FIG. 9 indicate one first-type time-frequency resource subpool among the multiple first-type time-frequency resource subpools respectively.

In one embodiment, each first-type time-frequency resource subpool in the first time-frequency resource pool occupies in time domain one second-type timeslot illustrated in Embodiment 8.

In one embodiment, time-domain resources occupied by each first-type time-frequency resource subpool in the first time-frequency resource pool belong to and are less than one second-type timeslot illustrated in Embodiment 8.

In one embodiment, the first time-frequency resource pool includes multiple first-type time-frequency resource subpools; and any two of the multiple first-type time-frequency resource subpools are not consecutive in time domain.

In one embodiment, the second time-frequency resource pool includes multiple second-type time-frequency resource subpools; and any two of the multiple second-type time-frequency resource subpools are not consecutive in time domain.

In one embodiment, any two of the multiple second-type time-frequency resource subpools occupy same subcarriers in frequency domain.

In one embodiment, any two of the multiple second-type time-frequency resource subpools occupy a same number of multicarrier symbols in time domain.

In one embodiment, any one of the multiple second-type time-frequency resource subpools occupies multiple consecutive multicarrier symbols, and any one of the multiple first-type time-frequency resource subpools occupies multiple consecutive multicarrier symbols.

In one embodiment, any one of the multiple second-type time-frequency resource subpools occupies a larger number of multicarrier symbols in time domain than any one of the multiple first-type time-frequency resource subpools.

In one embodiment, the third control information in the disclosure is transmitted in the second-type time-frequency resource subpool indicated by the box A1, the first radio signal in the disclosure is transmitted in the first-type time-frequency resource subpool indicated by the box C2, and the third control information includes configuration information of the first radio signal (as indicated by the arrow AR1); the first feedback information in the disclosure is transmitted in the second-type time-frequency resource subpool indicated by the box A3, and the first feedback information is used for indicating whether the first radio signal is correctly decoded (as indicated by the arrow AR2).

In the above embodiment, the transmission of the third control information and the first feedback information does not depend on the second-type monitoring result of the first node, thus the reliability of transmission is improved.

Embodiment 10

Figure 10:
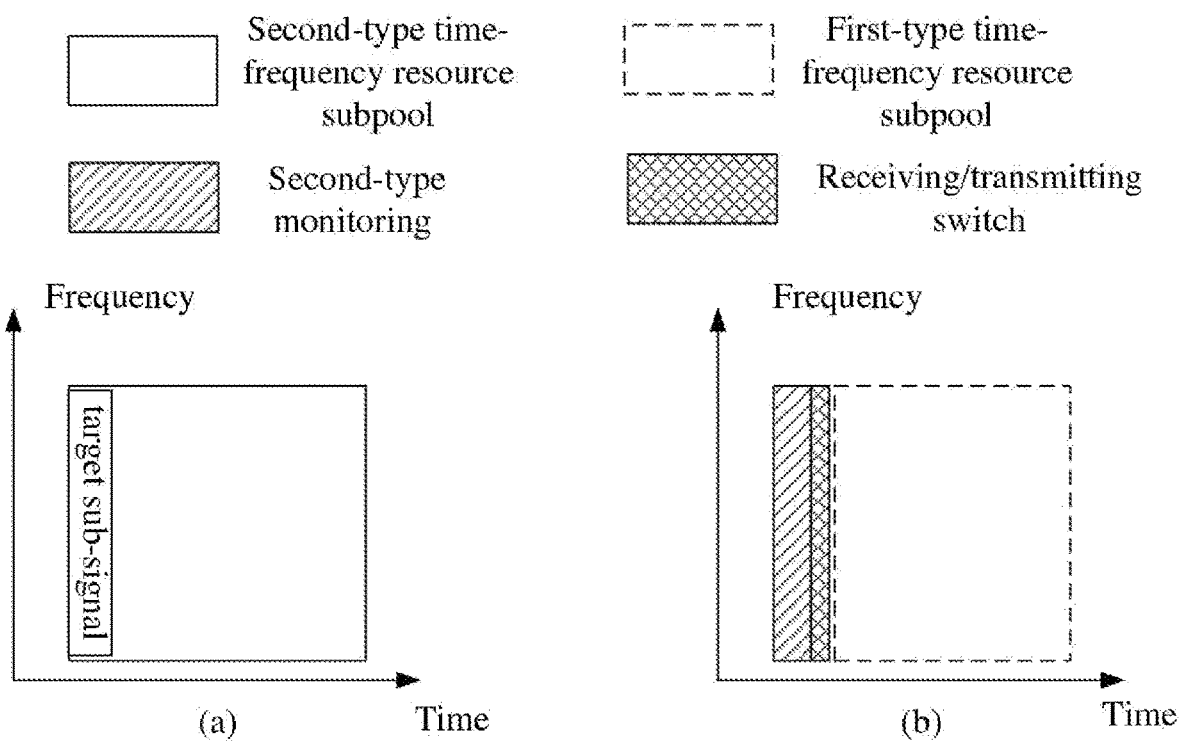
FIG. 10 is a diagram illustrating a first-type time-frequency resource subpool and a second-type time-frequency resource subpool according to one embodiment of the disclosure.

Embodiment 10 illustrates an example of a diagram of a first-type time-frequency resource subpool and a second-type time-frequency resource subpool, as shown in FIG. 10. In FIG. 10, a bold solid-line box indicates one second-type time-frequency resource subpool, a bold dash-line box indicates one first-type time-frequency resource subpool, a box filled with slashes indicates time-frequency resources in the first-type time-frequency resource subpool that are reserved to second monitoring, and a box filled with cross lines indicates a time interval in the first-type time-frequency resource subpool that is reserved to receiving/transmitting switch.

In Embodiment 10, a header of the first-type time-frequency resource subpool is used for transmitting a target sub-signal, and a length of a time interval occupied by the target sub-signal is the same as a length of the time-frequency resources in the first-type time-frequency resource pool that are reserved to second monitoring.

The first node monitors the target subsignal in the second monitoring to judge whether the corresponding first-type time-frequency resource subpool is idle, that is, whether the corresponding first-type time-frequency resource subpool can be used for transmitting a first radio signal.

In one embodiment, the action of monitoring a target sub-signal in the second monitoring is based on an energy detection.

In one embodiment, the action of monitoring a target sub-signal in the second monitoring is based on a signature sequence detection.

In one subembodiment, the target sub-signal is generated based on a signature sequence.

In one subembodiment, the target sub-signal includes a DeModulation Reference Signal (DMRS).

In one subembodiment, the target sub-signal includes a Discovery Reference Signal (DRS).

In one subembodiment, the target sub-signal includes a Synchronization Signal (SS).

In one embodiment, the action of monitoring a target sub-signal in the second monitoring includes a CRC detection, that is, the second monitoring includes channel decoding.

In one subembodiment, the target sub-signal includes Sidelink Control Information (SCI).

Embodiment 11

Figure 11:
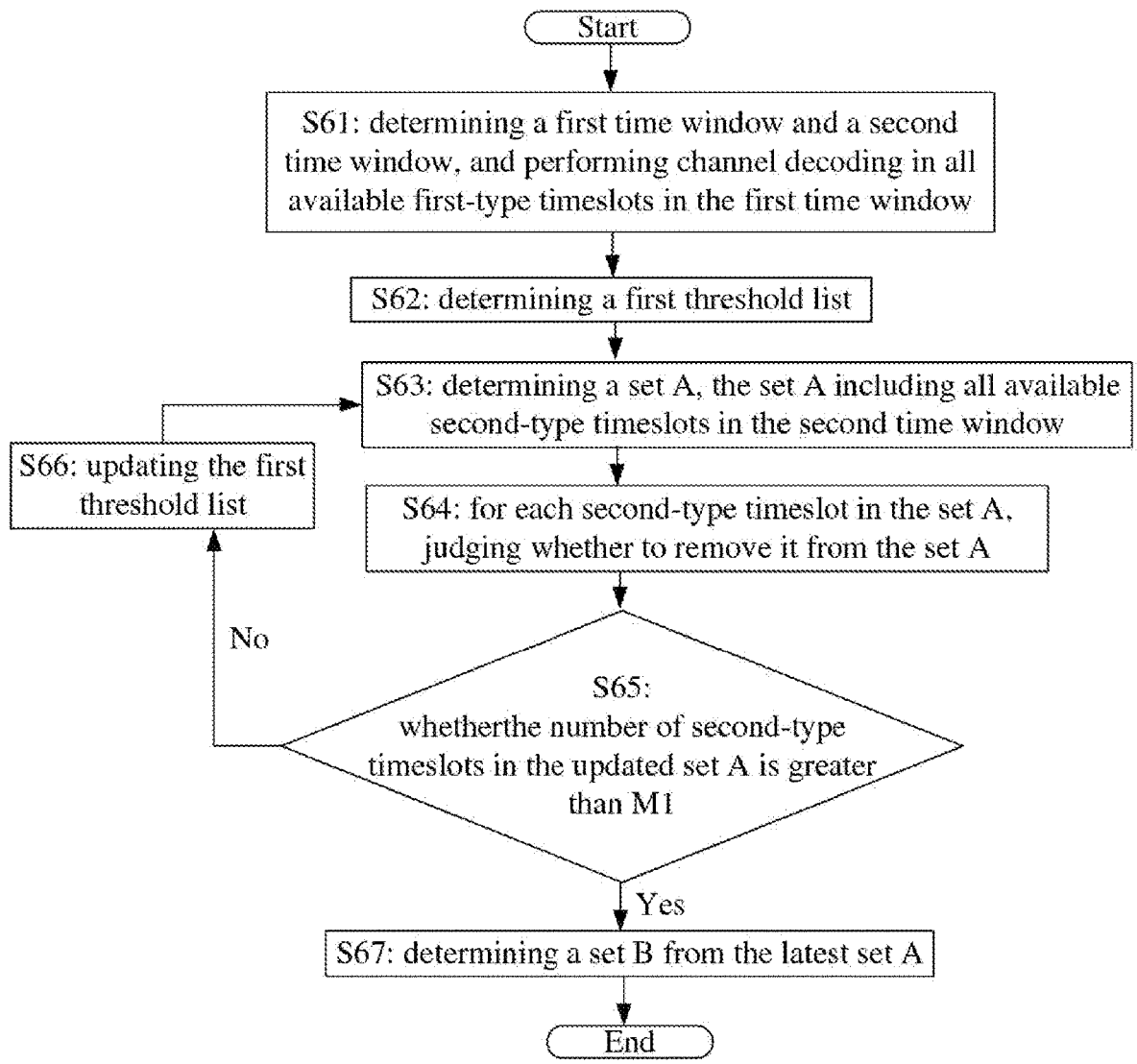
FIG. 11 is a flowchart of first-type monitoring according to one embodiment of the disclosure.

Embodiment 11 illustrates an example of a flowchart of first-type monitoring, as shown in FIG. 11.

In S61, a first node determines a first time window and a second time window, and performs channel decoding in all available first-type timeslots in the first time window; in S62, the first node determines a first threshold list, the first threshold list including a positive integer number of thresholds; in S63, the first node determines a set A, the set A including all available second-type timeslots in the second time window; in S64, for each second-type timeslot in the set A, the first node judges whether to remove it from the set A; in S65, the first node judges whether the number of second-type timeslots in the updated set A (that is, the set A obtained after S64 is completed) is greater than M1; if not, the first node updates the first threshold list in S66, and then goes to S63; if yes, the first node determines a set B from the latest set A in S67.

In Embodiment 11, in S64, the latest first threshold list is used for determining whether at least one second-type timeslot in the set A is removed from the set A.

In one embodiment, the M1 is a positive integer.

In one embodiment, the M1 is configurable.

In one embodiment, the M1 is a minimum integer not less than a product of 0.2 and M, the M being the number of all second-type timeslots in the second time window.

In one embodiment, the M1 is a minimum integer not less than a product of 0.2 and M, the M being the number of all second-type time-frequency resource subpools in the second time window; the second-type time-frequency resource subpool occupies one second-type timeslot in time domain and Y consecutive subchannels in frequency domain.

In one embodiment, the Y is a constant.

In one embodiment, the Y is configurable.

In one embodiment, any two second-type timeslots in the second time window include a same number of second-type time-frequency resource subpools.

In one embodiment, any two second-type time-frequency resource subpools located in one same second-type timeslot in the second time window are orthogonal (that is, non-overlapping) in frequency domain.

In one embodiment, in the S66, each threshold in the updated first threshold list increases 3 dB compared with each threshold in the previous first threshold list.

In one embodiment, in the S66, each threshold in the updated first threshold list increases 6 dB compared with each threshold in the previous first threshold list.

In one embodiment, in the S66, each threshold in the updated first threshold list increases XdB compared with each threshold in the previous first threshold list, the X being configurable.

In one embodiment, in S64, for any one second-type timeslot in the set A, if the first node fails to perform first monitoring (that is, perform channel decoding) in a corresponding first-type timeslot in the first time window, the any one second-type timeslot in the set A is removed from the set A.

In one embodiment, the corresponding first-type timeslot is before the any one second-type timeslot in the set A.

In one embodiment, the any one second-type timeslot in the set A is associated to multiple first-type timeslots in the first time window, and the corresponding first-type timeslot is one of the multiple first-type timeslots in the first time window.

In one embodiment, the any one second-type timeslot in the set A can be indicated by a target control signaling transmitted in the corresponding first-type timeslot.

In one embodiment, the any one second-type timeslot in the set A can be reserved by a target control signaling transmitted in the corresponding first-type timeslot.

In one embodiment, in S64, for any one second-type timeslot in the set A, if the first node detects in it a channel quality which is not higher than a corresponding threshold in the latest first threshold list, and the first node detects a target control signaling in the first time window and the target control signaling indicates the any one second-type timeslot in the set A, the any one second-type timeslot in the set A is removed from the set A; wherein the target control signaling is used for indicating the corresponding threshold from the latest first threshold list.

In one embodiment, the channel quality includes an RSRP.

In one embodiment, the channel quality includes an RSRP of a PSSCH channel.

In one embodiment, the set B includes M1 second-type timeslots in the set A which have minimum channel interferences.

In one embodiment, the channel interference in one second-type timeslot is a linear average value of RSSI in the one second-type timeslot.

In one embodiment, the channel interference in one second-type timeslot is a linear average value of sidelink-RSSI (S-RSSI) in the one second-type timeslot.

In one embodiment, the channel interference in one second-type timeslot is a linear average value of S-RSSI of all sub-channels in the one second-type timeslot.

In one embodiment, the target control signaling is an SCI.

In one embodiment, the target control signaling is transmitted on a PSCCH.

Embodiment 12

Figure 12:
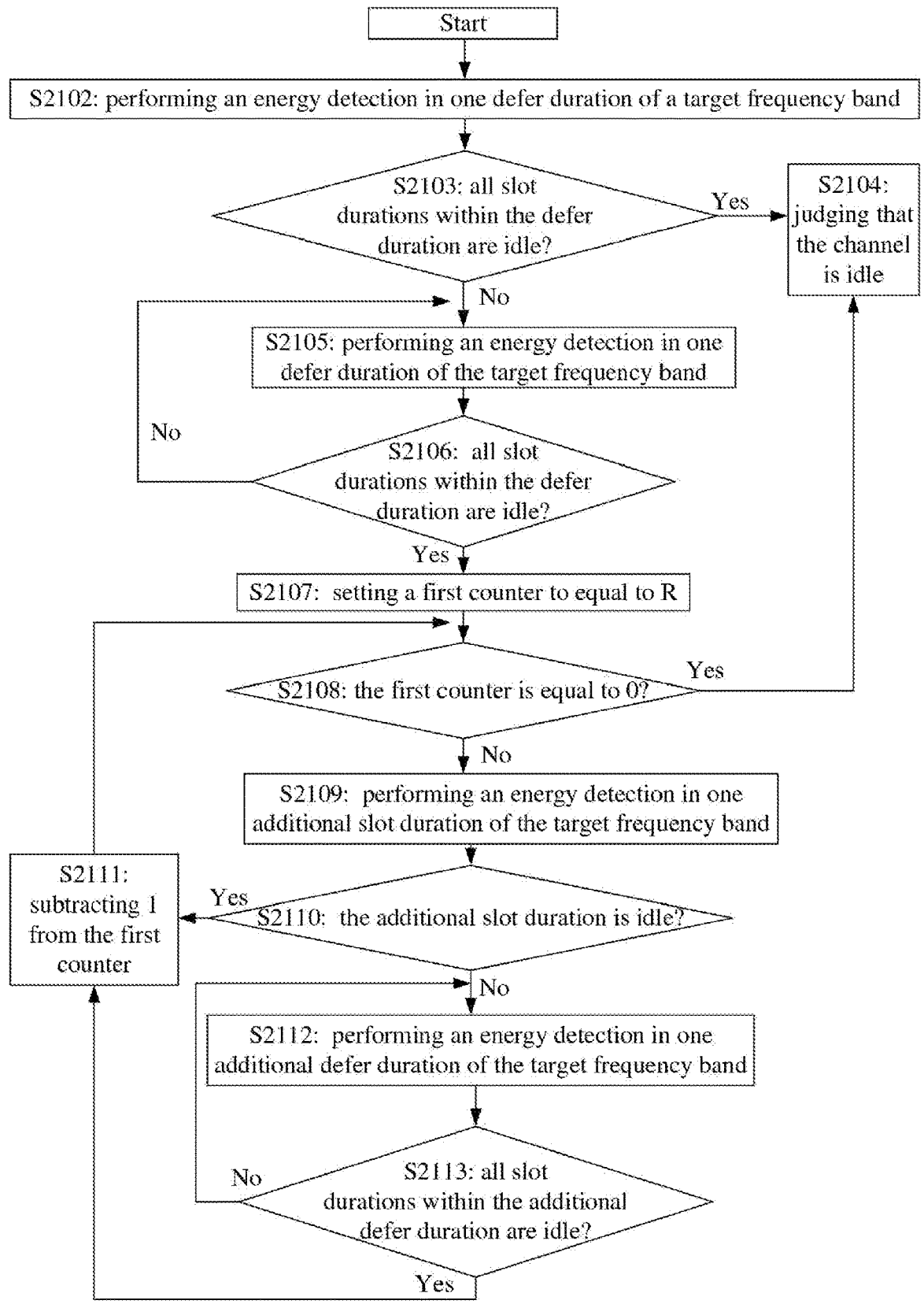
FIG. 12 is a flowchart of second-type monitoring according to one embodiment of the disclosure.

Embodiment 12 illustrates an example of a flowchart of second-type monitoring, as shown in FIG. 12.

A receiver performs an energy detection in one defer duration of a target frequency subband in S2102; judges whether all slot durations within the defer duration are idle in S2103, if idle, goes to S2104 to consider the channel is idle, otherwise, goes to S2105 to perform an energy detection in one defer duration of the target frequency subband; judges whether all slot durations within the defer duration are idle in S2106, if idle, goes to S2107 to set a first counter to equal to R1, otherwise, returns to S2105; judges whether the first counter is equal to 0 in S2108, if idle, goes to S2104, otherwise, goes to S2109 to perform an energy detection in one additional slot duration of the target frequency subband; judges whether the additional slot duration is idle in S2110, if idle, goes to S2111 to subtract 1 from the first counter, and then returns to S2108, otherwise, goes to S2112 to perform an energy detection in one additional defer duration of the target frequency subband; judges whether all slot durations within the additional defer duration are idle in S2113, if idle, goes to S2111, otherwise, returns to S2112.

In one embodiment, the defer duration is 25 us.

In one embodiment, the defer duration is not greater than 25 us.

In one embodiment, the defer duration is not less than 16 us.

In one embodiment, the defer duration is fixed.

In one embodiment, each slot duration in the defer duration is 9 us.

In one embodiment, each slot duration in the defer duration is not greater than 9 us.

In one embodiment, each slot duration in the defer duration is not less than 4 us.

In one embodiment, all slot durations in the defer duration are equal.

In one embodiment, the defer duration is successively divided into a positive integer number of slot durations and one time slice from front to rear, and the time slice has a duration less than the slot duration.

In one embodiment, the first radio signal in the disclosure is transmitted on the target frequency subband.

In one embodiment, the target frequency subband is one Bandwidth Part (BWP).

In one embodiment, the target frequency subband is one carrier.

In one embodiment, for any one slot duration in the defer duration, if a received power is greater than a specific threshold, the channel in the any one slot duration is considered not idle; and if a received power is not greater than a specific threshold, the channel in the any one slot duration is considered idle.

In one embodiment, for any one slot duration in the defer duration, if a received power is not less than a specific threshold, the channel in the any one slot duration is considered not idle; and if a received power is less than a specific threshold, the channel in the any one slot duration is considered idle.

In one embodiment, the specific threshold is −72 dBm.

In one embodiment, the specific threshold is configurable.

Embodiment 13

Figure 13:
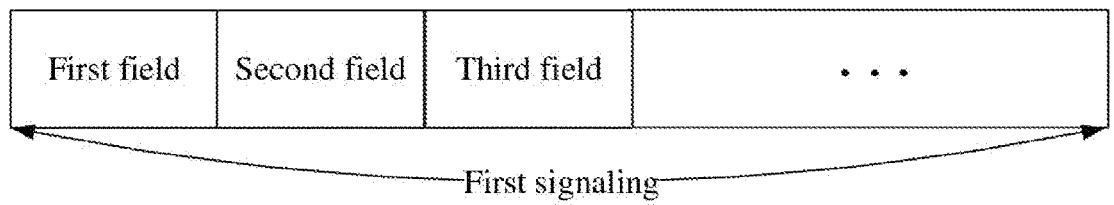
FIG. 13 is a diagram illustrating a first signaling according to one embodiment of the disclosure.

Embodiment 13 illustrates an example of a diagram of a first signaling, as shown in FIG. 13.

The first signaling includes a first field, a second field and a third field; the first field, the second field and the third field include a positive integer number of bits respectively.

In one embodiment, the first signaling is a physical layer signaling.

In one embodiment, the first signaling is transmitted on a PSCCH.

In one embodiment, the first field in the first signaling indicates the first control information in the disclosure, and the second field in the first signaling indicates the second control information in the disclosure.

In one subembodiment, the second field in the first signaling indicates the third control information in the disclosure.

Embodiment 14

Figure 14:
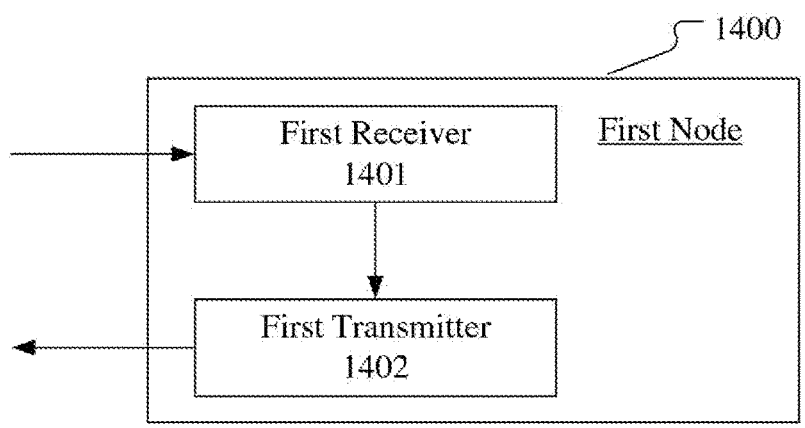
FIG. 14 is a structure block diagram illustrating a processing device in a first node according to one embodiment of the disclosure.
Figure 15:
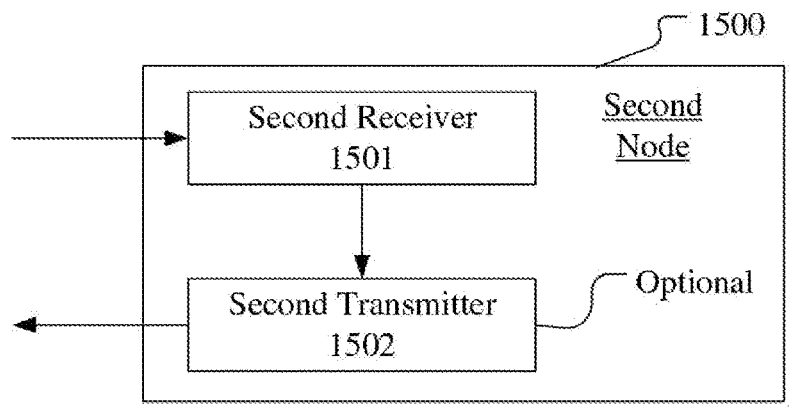
FIG. 15 is a structure block diagram illustrating a processing device in a second node according to one embodiment of the disclosure.

Embodiment 14 illustrates an example of a structure block diagram of a processing device in a first node, as shown in FIG. 14. In Embodiment 14, the first node 1400 includes a first receiver 1401 and a first transmitter 1402.

The first receiver 1401 performs first monitoring, and determines, according to the first monitoring, that a first time-frequency resource pool is not available for a second-type transmission; and the first transmitter 1402 transmits first control information, the first control information being used for reserving the first time-frequency resource pool to a first-type transmission.

In Embodiment 14, the first monitoring belongs to first-type monitoring; for the first-type transmission and the second-type transmission, second-type monitoring is only used for determining whether the first-type transmission can be performed; and the first-type monitoring is long-term while the second-type monitoring is short-term.

In one embodiment, the first time-frequency resource pool includes multiple first-type time-frequency resource subpools, and any two of the multiple first-type time-frequency resource subpools are not consecutive in time domain.

In one embodiment, time-domain resources occupied by the first time-frequency resource pool are indicated implicitly by time-domain resources occupied by the first control information.

In one embodiment, a number of time units between time units occupied by any one of the multiple first-type time-frequency resource subpools and time units occupied by the first control information is a positive integer multiple of a basic time length, the basic time length including a positive integer number of time units.

In one embodiment, the time unit is a subframe.

In one embodiment, the time unit is a timeslot.

In one embodiment, the time unit includes a positive integer number of multicarrier symbols.

In one embodiment, the number of time units in the basic time length is fixed.

In one embodiment, the number of time units in the basic time length is configurable.

In one embodiment, the first node 1400 is characterized in that: the first transmitter 1402 determines, according to the first monitoring, that a second time-frequency resource pool is available for the second-type transmission, and transmits second control information, the second control information being used for reserving the second time-frequency resource pool to the second-type transmission.

In one embodiment, the first node 1400 is characterized in that: the first transmitter 1402 selects a second time-frequency resource subpool from the second time-frequency resource pool; wherein the first control information is transmitted in the second time-frequency resource subpool.

In one embodiment, the first node 1400 is characterized in that: the first transmitter 1402 transmits a first radio signal directly; wherein the first radio signal is transmitted in the second time-frequency resource pool, and the first radio signal is directly transmitted.

In one embodiment, the first node 1400 is characterized in that: the first receiver 1401 performs second-monitoring to judge that time-frequency resources occupied by the first radio signal are available for wireless transmission, wherein the second monitoring belongs to the second-type monitoring; and the first transmitter 1402 transmits a first radio signal, wherein the first radio signal is transmitted in the first time-frequency resource pool.

In one embodiment, the first node 1400 is characterized in that: the first transmitter 1402 transmits third control information in the second time-frequency resource pool; wherein the third control information is used for the first time-frequency resource pool.

In one embodiment, the first node 1400 is characterized in that: the second time-frequency resource pool includes multiple second-type time-frequency resource subpools, and any two of the multiple second-type time-frequency resource subpools are not consecutive in time domain.

In one embodiment, time-domain resources occupied by the second time-frequency resource pool are indicated implicitly by time-domain resources occupied by the second control information.

In one embodiment, a number of time units between time units occupied by any one of the multiple second-type time-frequency resource subpools and time units occupied by the second control information is a positive integer multiple of a basic time length, the basic time length including a positive integer number of time units.

In one embodiment, the time unit is a subframe.

In one embodiment, the time unit is a timeslot.

In one embodiment, the time unit includes a positive integer number of multicarrier symbols.

In one embodiment, the number of time units in the basic time length is fixed.

In one embodiment, the number of time units in the basic time length is configurable.

In one embodiment, any two of the multiple second-type time-frequency resource subpools occupy same subcarrier(s) in frequency domain.

In one embodiment, any two of the multiple second-type time-frequency resource subpools occupy a same number of multicarrier symbols in time domain.

In on embodiment, any one of the multiple second-type time-frequency resource subpools occupies multiple consecutive multicarrier symbols, and any one of multiple first-type time-frequency resource subpools occupies multiple consecutive multicarrier symbols.

In one embodiment, any one of the multiple second-type time-frequency resource subpools occupies a larger number of multicarrier symbols in time domain than any one of the multiple first-type time-frequency resource subpools.

In one embodiment, the first node 1400 is characterized in that: the first receiver 1401 receives first feedback information; wherein the first feedback information is used for indicating whether the first radio signal is correctly decoded, the first radio signal is transmitted in the first time-frequency resource pool, and the first feedback information is transmitted in the second time-frequency resource pool.

In one embodiment, the first node is a UE, the first control information and the second control information belong to one same SCI.

In one embodiment, the first receiver 1401 includes the antenna 420, the receiver 418 and the receiving processor 470 shown in FIG. 4.

In one embodiment, the first receiver 1401 includes the controller/processor 475 shown in FIG. 4.

In one embodiment, the first receiver 1401 includes the multi-antenna receiving processor 472 shown in FIG. 4.

In one embodiment, the first transmitter 1402 includes the antenna 420, the transmitter 418 and the transmitting processor 416 shown in FIG. 4.

In one embodiment, the first transmitter 1402 includes the controller/processor 475 shown in FIG. 4.

In one embodiment, the first transmitter 1402 includes the multi-antenna transmitting processor 471 shown in FIG. 4.

Embodiment 15

Embodiment 15 illustrates an example of a structure block diagram of a processing device in a second node, as shown in FIG. 5. In Embodiment 15, the second node 1500 includes a second receiver 1501 and a second transmitter 1502, wherein the second transmitter 1502 is optional.

The second receiver 1501 receives first control information, the first control information being used for reserving a first time-frequency resource pool to a first-type transmission.

In Embodiment 15, first monitoring is used for determining that the first time-frequency resource pool is not available for a second-type transmission; the first monitoring belongs to first-type monitoring; for the first-type transmission and the second-type transmission, second-type monitoring is only used for determining whether the first-type transmission can be performed; and the first-type monitoring is long-term while the second-type monitoring is short-term.

In one embodiment, the first time-frequency resource pool includes multiple first-type time-frequency resource subpools, and any two of the multiple first-type time-frequency resource subpools are not consecutive in time domain.

In one embodiment, the second receiver 1501 receives second control information, the second control information being used for reserving a second time-frequency resource pool to the second-type transmission; wherein the first monitoring is used for determining that the second time-frequency resource pool is available for the second-type transmission.

In one embodiment, the second receiver 1501 monitors the first control information in the second time-frequency resource pool, wherein the first control information is received in a second time-frequency resource subpool, and the second time-frequency resource subpool belongs to the second time-frequency resource pool.

In one embodiment, the second receiver 1501 receives a first radio signal; wherein the first radio signal is transmitted in the second time-frequency resource pool, and the first radio signal is directly transmitted; or, the first radio signal is transmitted in the first time-frequency resource pool, second monitoring is used for judging that time-frequency resources occupied by the first radio signal are available for wireless transmission, and the second monitoring belongs to the second-type monitoring.

In one embodiment, the second receiver 1501 receives third control information in the second time-frequency resource pool.

Herein, the third control information is used for the first time-frequency resource pool.

In one embodiment, the second time-frequency resource pool includes multiple second-type time-frequency resource subpools, and any two of the multiple second-type time-frequency resource subpools are not consecutive in time domain.

In one embodiment, the second transmitter 1502 transmits first feedback information; wherein the first feedback information is used for indicating whether the first radio signal is correctly decoded, the first radio signal is transmitted in the first time-frequency resource pool, and the first feedback information is transmitted in the second time-frequency resource pool.

In one embodiment, the first control information is transmitted on a PSCCH.

In one embodiment, the first control information and the second control information are transmitted on one same physical layer channel.

In one embodiment, the second receiver 1501 includes the antenna 452, the receiver 454 and the receiving processor 456 shown in FIG. 4.

In one embodiment, the second receiver 1501 includes the controller/processor 459 shown in FIG. 4.

In one embodiment, the second receiver 1501 includes the multi-antenna receiving processor 458 shown in FIG. 4.

In one embodiment, the second transmitter 1502 includes the antenna 452, the transmitter 454 and the transmitting processor 468 shown in FIG. 4.

In one embodiment, the second transmitter 1502 includes the controller/processor 459 shown in FIG. 4.

In one embodiment, the second transmitter 1502 includes the multi-antenna transmitter 457 shown in FIG. 4.

In one embodiment, the first time-frequency resource pool and the second time-frequency resource pool are orthogonal in frequency domain.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station in the disclosure includes but not limited to macro-cellular base stations, micro-cellular base stations, home base stations, relay base station, gNB, TRP and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a first node for wireless communication, comprising:
performing first monitoring, and determining, according to the first monitoring, that a first time-frequency resource pool is not available for a second-type transmission; and
transmitting first control information, the first control information being used for reserving the first time-frequency resource pool to a first-type transmission;
wherein the first monitoring belongs to first-type monitoring; for the first-type transmission and the second-type transmission, second-type monitoring is only used for determining whether the first-type transmission can be performed; and the first-type monitoring is long-term while the second-type monitoring is short-term.

2. The method according to claim 1, wherein the first time-frequency resource pool comprises multiple first-type time-frequency resource subpools, and any two of the multiple first-type time-frequency resource subpools are not consecutive in time domain.

3. The method according to claim 1, comprising:
determining, according to the first monitoring, that a second time-frequency resource pool is available for the second-type transmission; and
transmitting second control information, the second control information being used for reserving the second time-frequency resource pool to the second-type transmission.

4. The method according to claim 3, comprising:
selecting a second time-frequency resource subpool from the second time-frequency resource pool;
wherein the first control information is transmitted in the second time-frequency resource subpool.

5. The method according to claim 3, comprising:
transmitting a first radio signal;
wherein the first radio signal is transmitted in the second time-frequency resource pool, and the first radio signal is directly transmitted; or, the first radio signal is transmitted in the first time-frequency resource pool, and the method further comprises:
performing second-monitoring to judge that time-frequency resources occupied by the first radio signal are available for wireless transmission;
wherein the second monitoring belongs to the second-type monitoring.

6. The method according to claim 3, comprising:
transmitting third control information in the second time-frequency resource pool;
wherein the third control information is used for the first time-frequency resource pool.

7. The method according to claim 2, wherein the second time-frequency resource pool comprises multiple second-type time-frequency resource subpools, and any two of the multiple second-type time-frequency resource subpools are not consecutive in time domain.

8. The method according to claim 5, comprising:
receiving first feedback information;
wherein the first feedback information is used for indicating whether the first radio signal is correctly decoded, the first radio signal is transmitted in the first time-frequency resource pool, and the first feedback information is transmitted in the second time-frequency resource pool.

9. A method in a second node for wireless communication, comprising:
receiving first control information, the first control information being used for reserving a first time-frequency resource pool to a first-type transmission;
wherein first monitoring is used for determining that the first time-frequency resource pool is not available for a second-type transmission; the first monitoring belongs to first-type monitoring; for the first-type transmission and the second-type transmission, second-type monitoring is only used for determining whether the first-type transmission can be performed; and the first-type monitoring is long-term while the second-type monitoring is short-term.

10. The method according to claim 9, wherein the first time-frequency resource pool comprises multiple first-type time-frequency resource subpools, and any two of the multiple first-type time-frequency resource subpools are not consecutive in time domain.

11. The method according to claim 9, comprising:
receiving second control information, the second control information being used for reserving a second time-frequency resource pool to the second-type transmission;
wherein the first monitoring is used for determining that the second time-frequency resource pool is available for the second-type transmission.

12. The method according to claim 11, comprising:
monitoring the first control information in the second time-frequency resource pool;
wherein the first control information is received in a second time-frequency resource subpool, and the second time-frequency resource subpool belongs to the second time-frequency resource pool.

13. The method according to claim 11, comprising:
receiving a first radio signal;
wherein the first radio signal is transmitted in the second time-frequency resource pool, and the first radio signal is directly transmitted; or, the first radio signal is transmitted in the first time-frequency resource pool, second monitoring is used for judging that time-frequency resources occupied by the first radio signal are available for wireless transmission, and the second monitoring belongs to the second-type monitoring.

14. The method according to claim 11, comprising:
receiving third control information in the second time-frequency resource pool;
wherein the third control information is used for the first time-frequency resource pool.

15. The method according to claim 10, wherein the second time-frequency resource pool comprises multiple second-type time-frequency resource subpools, and any two of the multiple second-type time-frequency resource subpools are not consecutive in time domain.

16. The method according to claim 13, comprising:
transmitting first feedback information;
wherein the first feedback information is used for indicating whether the first radio signal is correctly decoded, the first radio signal is transmitted in the first time-frequency resource pool, and the first feedback information is transmitted in the second time-frequency resource pool.

17. A first node for wireless communication, comprising:
a first receiver, to perform first monitoring, and to determine, according to the first monitoring, that a first time-frequency resource pool is not available for a second-type transmission; and
a first transmitter, to transmit first control information, the first control information being used for reserving the first time-frequency resource pool to a first-type transmission;
wherein the first monitoring belongs to first-type monitoring; for the first-type transmission and the second-type transmission, second-type monitoring is only used for determining whether the first-type transmission can be performed; and the first-type monitoring is long-term while the second-type monitoring is short-term.

18. The first node according to claim 17, wherein
the first receiver determines according to the first monitoring that a second time-frequency resource pool is available for the second-type transmission; and
the first transmitter transmits second control information, the second control information being used for reserving the second time-frequency resource pool to the second-type transmission.

19. A second node for wireless communication, comprising:
a second receiver, to receive first control information, the first control information being used for reserving a first time-frequency resource pool to a first-type transmission;
wherein first monitoring is used for determining that the first time-frequency resource pool is not available for a second-type transmission; the first monitoring belongs to first-type monitoring; for the first-type transmission and the second-type transmission, second-type monitoring is only used for determining whether the first-type transmission can be performed; and the first-type monitoring is long-term while the second-type monitoring is short-term.

20. The second node according to claim 19, wherein
the second receiver receives second control information, the second control information being used for reserving a second time-frequency resource pool to the second-type transmission;
wherein the first monitoring is used for determining that the second time-frequency resource pool is available for the second-type transmission.

* * * * *